(12) United States Patent
Iwig et al.

(10) Patent No.: US 9,718,738 B2
(45) Date of Patent: Aug. 1, 2017

(54) FERTILIZER COMPOSITIONS AND METHODS OF MAKING THE SAME

(71) Applicant: ALCOA INC., Pittsburgh, PA (US)

(72) Inventors: David F. Iwig, Greensburg, PA (US); Raymond J. Kilmer, Pittsburgh, PA (US); Charles L. Dobbs, Apollo, PA (US); Judodine Nichols, Murrysville, PA (US); John R. Smith, Pittsburgh, PA (US); Mark L. Weaver, Greenwell Springs, LA (US); Shannon L. I. Parks, Sarver, PA (US); Mikhail Gershenzon, Murrysville, PA (US)

(73) Assignee: ALCOA USA CORP., Pittsburgh, PA (US)

( * ) Notice: Subject to any disclaimer, the term of this patent is extended or adjusted under 35 U.S.C. 154(b) by 0 days.

(21) Appl. No.: 14/627,803

(22) Filed: Feb. 20, 2015

(65) Prior Publication Data

US 2015/0239790 A1     Aug. 27, 2015

Related U.S. Application Data

(60) Provisional application No. 61/942,804, filed on Feb. 21, 2014.

(51) Int. Cl.
| | | |
|---|---|---|
| *C05C 9/00* | (2006.01) | |
| *C05G 3/00* | (2006.01) | |
| *C05C 1/00* | (2006.01) | |
| *C05D 9/00* | (2006.01) | |

(52) U.S. Cl.
CPC .............. *C05G 3/0035* (2013.01); *C05C 1/00* (2013.01); *C05C 9/005* (2013.01); *C05D 9/00* (2013.01); *C05G 3/0041* (2013.01)

(58) Field of Classification Search
None
See application file for complete search history.

(56) References Cited

U.S. PATENT DOCUMENTS

| | | | | |
|---|---|---|---|---|
| 3,598,563 A | * | 8/1971 | Burch ..................... C05C 9/005 71/28 |
| 8,361,185 B2 | * | 1/2013 | Kottegoda ................ C05B 3/00 71/29 |
| 2003/0150249 A1 | * | 8/2003 | Gillman ................... C05D 5/00 71/31 |
| 2004/0219089 A1 | | 11/2004 | Kuhlmann et al. | |

(Continued)

FOREIGN PATENT DOCUMENTS

| | | |
|---|---|---|
| DE | 19743606 A1 | 4/1999 |
| EP | 1661876 A2 | 5/2006 |
| JP | 2001089283 A | 4/2001 |

(Continued)

OTHER PUBLICATIONS

International Search Report mailed May 26, 2015 issued in corresponding International Application No. PCT/US2015/016840.

(Continued)

*Primary Examiner* — Wayne Langel
(74) *Attorney, Agent, or Firm* — Greenberg Traurig, LLP

(57) ABSTRACT

Fertilizer compositions are provided, where a fertilizer composition includes: an inner portion including a nitrogen containing material; and an outer portion covering the inner portion, the outer portion including a release agent (e.g. HTC, BR).

17 Claims, 8 Drawing Sheets

(56) References Cited

U.S. PATENT DOCUMENTS

2009/0084149 A1* 4/2009 Van Der Werf ........... B01J 2/26
                                                    71/28
2011/0296885 A1* 12/2011 Nilwala ................... C05B 3/00
                                                    71/29

FOREIGN PATENT DOCUMENTS

| JP | 2005-324981 | * | 11/2005 |
| JP | 2009-242195 | * | 10/2009 |
| WO | 0155057 A1 | | 8/2001 |
| WO | 2004046064 A1 | | 6/2004 |
| WO | 2004099104 A1 | | 11/2004 |

OTHER PUBLICATIONS

Written Opinion of the International Searching Authority mailed May 26, 2015 issued in corresponding International Application No. PCT/US2015/016840.

* cited by examiner

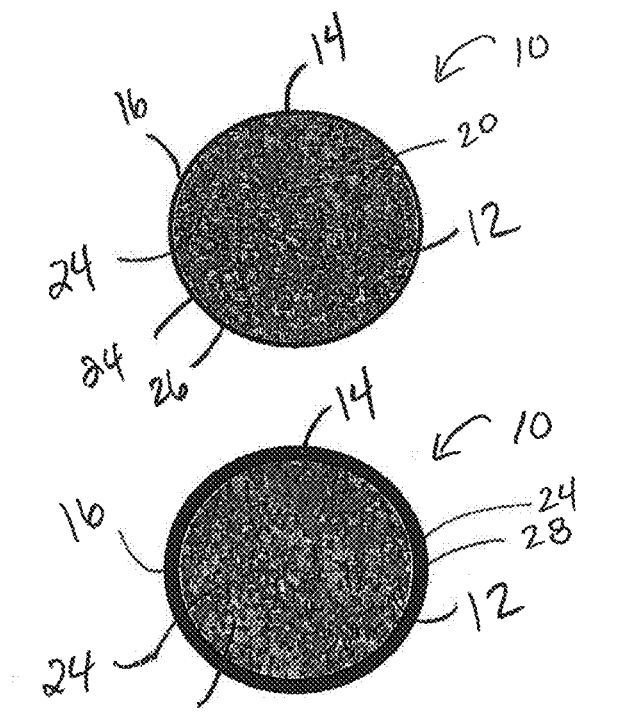
Figure 2A
Figure 2B
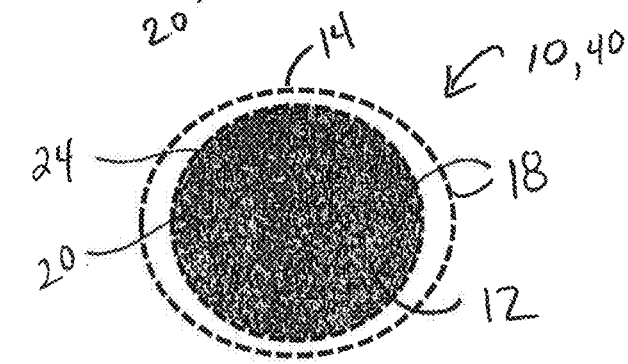
Figure 2C
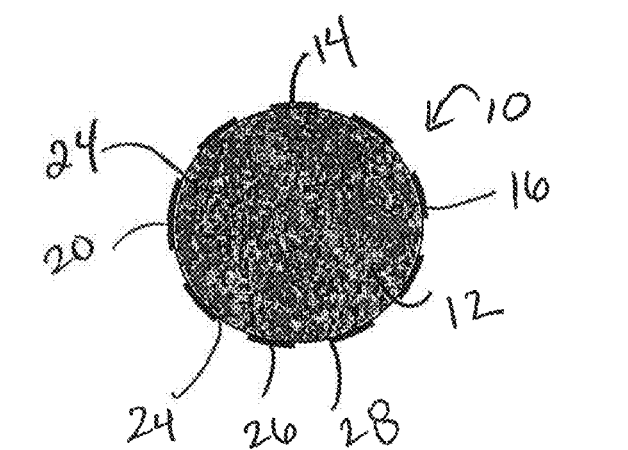
Figure 2D

FERTILIZER COMPOSITIONS AND METHODS OF MAKING THE SAME

CROSS-REFERENCE TO RELATED APPLICATIONS

This application claims priority to U.S. Provisional Application No. 61/942,804, filed on Feb. 21, 2014. The disclosure of U.S. Provisional Applications No. 61/942,804 is hereby incorporated by reference in its entirety for all purposes.

FIELD OF THE INVENTION

Broadly, the instant disclosure is directed towards fertilizer compositions including nitrogen containing compositions (e.g. urea) and release agent(s). More specifically, fertilizer compositions and methods of making the same are provided, where the fertilizer compositions include an inner portion, comprising a nitrogen containing material (e.g. volatilization prone nitrogen containing material like urea or leaching/run-off prone nitrogen containing material like ammonium nitrate, diammonium phosphate, or organic-based materials/manure) and an outer portion (e.g. coating or shell) including at least one release agent. In some embodiments, the release agent is configured to promote a slow release/controlled release of the material in the inner portion.

In some embodiments, the release agent is configured to provide: (a) soil conditioners such as increased soil buffering capacity; (b) soil amelioration such as increased soil moisture capacity; (c) minimization of runoff of nutrients such as nitrogen and phosphorous via ammonium binding and phosphate adsorption; (d) nutrients (e.g. micronutrients, macronutrients) to the soil; (e) a physical barrier to the volatilization and/or evaporation and/or leaching of the nitrogen-based material (e.g. urea) and/or inhibits the urease enzyme thereby slowing/controlling the release of the material in the inner portion of the fertilizer; and combinations thereof.

BACKGROUND

Nitrogen containing fertilizer (e.g. urea) fertilizer can be applied to soil in a solid, willed form. The nitrogen containing fertilizer can be broken down to ammonia by proteins in the soil (urease). The resultant ammonia can volatilize (evaporate) under certain conditions before it is taken up by plants. Alternatively, ammonium nitrate is water soluble and susceptible to losses of nutrients arising from leaching or field run-off.

SUMMARY OF THE DISCLOSURE

Broadly, the present disclosure relates to fertilizer compositions that include a nitrogen containing material (e.g. urea) and a release agent, where the release agent is configured to provide a controlled release and/or slow release fertilizer (e.g. reduce, prevent, or eliminate the volatilization or leaching/run-off of the nitrogen containing material).

Without being bound by a particular mechanism or theory, the release agent is believed to provide a physical barrier to protect the urea from being broken down (i.e. into urease). Also, without being bound by a particular mechanism or theory, the release agent (e.g. bauxite residue) is believed to remove dissolved ammonia, which can slow the release of nitrogen further. Without being bound by a particular mechanism or theory, the release agent is believed to provide structural integrity, by preventing release agent removal (due to processing and/or handling) and/or improving the malleability of the final product.

As used herein, "fertilizer" means: a substance used to make a growing medium (e.g. soil) more fertile. In some embodiments, a fertilizer includes: a nitrogen containing material (e.g. urea, ammonium nitrate, diammonium phosphate, manure, anhydrous ammonia, ammonium sulfate, ammonium phosphates, calcium nitrate, or combinations thereof).

In some embodiments, the fertilizer includes an outer coating, layer, and/or shell having at least one release agent (e.g. release agent with optional binder, filler, and/or additive) over an inner portion of nitrogen containing material (e.g. a urea composition or material). In some embodiments, the outer layer/portion comprises a coating (e.g. complete shell which encases the inner portion). In some embodiments, the outer layer/portion comprises at least one partial covering (e.g. in a multi-layered fertilizer composition), which promotes a slow release or controlled release of the inner portion, which is retained inside the multiple layers. In some embodiments, the outer layer includes a plurality (e.g. two, three, four, or more) of partial layers, which cooperate to act as a single outer layer in promoting a slow release or controlled release of the inner portion, which is retained inside the multiple layers.

As used herein, "form" means: the shape or structure of something (as distinguished from its material composition). As some non-limiting examples, the fertilizer form includes: pellets, prills, granules, disks, particulate, powder, and combinations thereof. In some embodiments, the pellets have at least one of an outer layer, a coating, and/or shell. In some embodiments, the prills have at least one of an outer layer, a coating, and/or shell. In some embodiments, the granules have at least one of an outer layer, a coating, and/or shell. In some embodiments, the disks have at least one of an outer layer, a coating, and/or shell. In some embodiments, the particulates have at least one of an outer layer, a coating, and/or shell. In some embodiments, the powder has at least one of an outer layer, a coating, and/or shell. In some embodiments, the fertilizer composition of the instant disclosure is in a single form (i.e. pellets, prills, granules, disks, particulate, or powder). In some embodiments, the fertilizer composition of the instant disclosure is in multiple forms (i.e. a mixture of two or more forms, including pellets, prills, granules, disks, or powder).

As used herein, "prill" means: a pellet formed by generating droplets allowing the drops to solidify. In some embodiments, the release agent(s) is/are added nitrogen containing material prior to prilling. In some embodiments, the release agent(s) is/are added to nitrogen containing material after prilling (i.e. co-prilling or coating after the nitrogen containing material product is prilled).

In some embodiments, the mesh size of a prill product is between 4 and 20 mesh (i.e. ~4700 microns-~830 microns), As used herein, "pellet" means a solid body (e.g. spherical, rounded, cylindrical). In some embodiments, the nitrogen containing material and release agent(s) are ground (e.g. milled), mixed, and then pelletized together to form a pellet, which contains both nitrogen containing material and release agent(s) therein, at a desired weight percentage. In some embodiments, the mesh size of a pelletized product is between 4 and 20 mesh.

As used herein, "powder" means: matter in a finely divided state. In some embodiments, the nitrogen-containing material and release agent(s) are ground (either independently or in combination) to yield a powder product having a particular average particle size. In some embodiments, the mesh size of a powder product is greater than 20 mesh.

As used herein, "granule" means: a small particle. In some embodiments, the nitrogen containing material is crushed (i.e. reduced in size from prilled or pellet form) into smaller pieces (which are particulate in form as opposed to powder). In some embodiments, the nitrogen containing material is combined with the release agent(s) during the production process to form a composition having both nitrogen containing material and release agent(s) therein. In some embodiments, the mesh size of a granule product is between 4 and 20 mesh.

In some embodiments, the fertilizer composition comprises a homogenous mixture.

In some embodiments, the fertilizer composition comprises a heterogeneous mixture.

In some embodiments, the fertilizer compositions include: uncoated materials, coated materials, and/or multi-coated materials (i.e. more than one coating).

As used herein, "inner" means: situated inside.

As used herein, "outer" means: situated outside or external.

As used herein, "coating" means: a layer of something which covers something else.

As used herein, "shell" means: an outer casing. In some embodiments, the shell protects the inner portion (e.g. by enclosing/encasing it).

As used herein, "encasing" means: surrounding on all sides.

As used herein, "partial" means: existing only in part. In some embodiments, the coating is a partial coating, in that it does not completely surround the inner core on all sides. As one example, a partial coating covers one side (or end) of the inner core. As another example, a partial coating substantially surrounds the inner core but has discontinuous regions (e.g. small holes or ridges where there is no coverage).

In some embodiments, multiple partial coatings are configured to cooperate as an encasing layer (e.g. multiple layers of 50% coverage cooperate in the same way that a single encasing layer would, to prevent the inner core from volatilization/evaporation).

As used herein, "nitrogen containing material" means: a substance having nitrogen in its composition or make-up. In some embodiments, a nitrogen containing material is a fertilizer having nitrogen therein (e.g. in the form of urea, ammonia, or ammonium). Some non-limiting examples of nitrogen containing material include: urea composition, urea, ammonium nitrate, diammonium phosphate, nitrogen-based fertilizers (with fertilizer and optional fillers and/or inert agents), organic based materials like manure, and combinations thereof.

As used herein, "urea composition" means: a material having urea. In some embodiments, urea composition means urea and unavoidable impurities (e.g. included as part of the manufacture process). As a non-limiting example, urea composition refers to a urea fertilizer (e.g. including urea with optional fillers and/or inert agents).

As used herein, "urea" means: $CO(NH_2)_2$.

As used herein, "release agent" means: a material or component that impacts (e.g. reduces, restricts, prevents, and/or eliminates) the ability of another material to escape from confinement and/or be released. In some embodiments, a release agent is used in combination with a tiller, binder, and/or additive (as set out below), in some embodiments, the release agent acts as a binder, filler, and/or additive in the fertilizer composition.

Some non-limiting examples of release agents include: bauxite residue, layered double hydroxides (e.g. hydrotalcite, hydrocalumite), apatite, electrostatic precipitator fines, bauxite, red lime, neutralized bauxite residue, dawsonite, fukalite, aluminum hydroxide, smelter grade alumina (SGA), and combinations thereof.

As used herein, "binder" means: a material that is used to hold things together. In some embodiments, the binder is used to fill in the cracks on the outer portion or coating. Some non-limiting examples of binders include: commercially available pellet binders (e.g. used in the chemical or pharmaceutical industries), polymers, inorganic solvents (e.g. water), organic solvents, alginates, alginate-calcium chloride solution(s), lignosulfonates, attapulgite, asphalt wax, resin, reactive metal salts with reactive metal oxides or hydroxides, molasses, Portland cement, silicates (e.g. sodium silicates), or naturally occurring clay (e.g. bentonite clay), starch, corn starch, sugar, sugar water, flour, guar gum, plaster of Paris, waste from paper mills, cellulose derivatives, and combinations thereof.

As used herein, "filler" means: a material used to fill a cavity or increase bulk. Some non-limiting examples of filler include: wax (e.g. paraffin wax, agricultural waxes), polymers, silicates, or Portland cement, and combinations thereof.

As used herein, "fertilizer additive" means: a material added to fertilizer (e.g. in order to impart a characteristic or property). In some embodiments, the fertilizer additive is selected in order to add a particular nutrient or several nutrients to the soil (e.g. where the soil is deficient in these nutrients). A non-limiting example of a fertilizer additive includes gypsum, which, when present in one or more of the fertilizer compositions of the instant disclosure, provides sulfur to the growing medium (e.g. soil).

As used herein, "byproduct of metal production" means: a compound or class of materials that is produced by one or more processes of making non-ferrous metal (e.g. aluminum). Some non-limiting processes include: the Bayer process, smelting, refining, casting, recycling, producing various products, product forms, and combinations thereof.

Some non-limiting examples of release agents that are products of aluminum production and/or processing include: apatite, electrostatic precipitator fines (ESP), Bayer process byproducts, and combinations thereof.

As used herein, "Bayer process byproduct" means: a substance produced during the reduction of bauxite to form/produce alumina. Non-limiting examples of release agents that are Bayer process byproducts include: layered double hydroxides, hydrotalcite, hydrocalumite, bauxite residue, neutralized bauxite residue, dawsonite, fukalite, aluminum hydroxide, smelter grade alumina (SGA), and combinations thereof.

As used herein, "layered double hydroxide" means: a class of compounds which are characterized by multiple (e.g. two) positively charged layers and weakly bound, often exchangeable central ion(s) (e.g. negatively charged ions) located in the interlayer (middle) region. As a non-limiting example, LDHs are commonly referred to by the following generic chemical formula:

$$[M^{2+}_{1-x}M^{3+}_x(OH)_2]^{q+}(X^{n-})_{q/n} \cdot yH_2O \qquad \text{(eq. 1)}$$

As some non-limiting examples, z=2, $M^{2+}$=Ca, $Mg^{2+}$, $Mn^{2+}$, $Fe^{2+}$, $Co^{2+}$, $Ni^{2+}$, $Cu^{2+}$, or $Zn^{2+}$, (hence q=x).

Non-limiting examples of LDH compounds include: hydrotalcites, hydrocalumite, hydromagnesite, takovite, woolite, and combinations thereof.

In some embodiments, "unavoidable minor components" means: various chemicals and minerals that are present in the release agents. Some non-limiting examples include: iron-containing compounds (e.g. $Fe_2O_3$; FeOOH; $Fe_3O_4$); silicon-containing compounds (e.g. $SiO_2$); titanium-containing compounds (e.g. $TiO_2$); sodium-containing compounds (e.g. NaOH; $NaNO_3$; $Na_3PO_4$; $Na_2HPO_4$; $Na_2CO_3$); calcium-containing compounds (e.g. CaO; $Ca(OH)_2$; $CaSO_4$; $CaCO_3$; $Ca_3(Al(OH)_4)_6$; TCA (tricalcium aluminate)); magnesium-containing compounds (e.g. MgO; $Mg(OH)_2$; $MgCO_2$); anionic organic compounds (e.g. oxalate (sodium oxalate), formate (ammonia formate), acetate,); aluminum-containing compounds (e.g. $Al(OH)_3$; AlOOH); and combinations thereof.

In some embodiments, the total weight percent of unavoidable minor components is not greater than 30 wt. % (i.e. for each compound). In some embodiments, the unavoidable minor component is: not greater than 30 wt. %; not greater than 25 wt. %; not greater than 20 wt. %; not greater than 15 wt. %; not greater than 10 wt. %; not greater than 7 wt. %; not greater than 5 wt. %; not greater than 3 wt. %; not greater than 1%; not greater than 0.5 wt. %; not greater than about 0.3 wt. %; or not greater than 0.1 wt. %.

In some embodiments, the unavoidable minor component is: not less than 30 wt. %; not less than 25 wt. %; not less than 20 wt. %; not less than 15 wt. %; not less than 10 wt. %; not less than 7 wt. %; not less than 5 wt. %; not less than 3 wt. %; not less than 1%; not less than 0.5 wt. %; or not less than about 0.1 wt. %.

In some embodiments, for bauxite residue the unavoidable minor component content is not greater than 30 wt. % for each component.

In some embodiments, for bauxite, the content of unavoidable minor components is not greater than 30 wt. % for each component.

In some embodiments, for HTC, the content of unavoidable minor components is not greater than 20 wt. % for each component.

In some embodiments, for apatite, the content of unavoidable minor components is not greater than 20 wt. % for each component, In some embodiments, for smelting grade alumina, the content of unavoidable minor components is not greater than about 1 wt. %.

As used herein, "intercalated" means: a substances which has another substance or material inserted between or among existing elements or layers. In some embodiments, an LDH is intercalated with its central/interlayer region being replaced with other anions or compounds.

Non-limiting examples of intercalated LDH (sometimes called iLDH) include: herbicides, pesticides, anti-fungal agents, supplemental nutrients (e.g, phosphorous compounds, nitrogen compounds, sulfur compounds, trace-element compounds, and combinations thereof). In some embodiments, the LDH is intercalated with a nitrate. In some embodiments, the LDH is intercalated with a sulfate. In some embodiments, the LDH is intercalated with a phosphate.

In some embodiments, LDH comprises hydrotalcite (HTC). In some embodiments, LDH comprises hydrocalumite.

As used herein, "hydrotalcite" means: a layered double hydroxide of the following formula:

$$Mg_6Al_2(CO_3)(OH)_{16}*4(H_2O) \quad \text{(eq. 2)}$$

Non-limiting examples of groups of materials within the hydrotalcites supergroup include: hydrotalcites group, quintinite group, fougerite group, woodwardite group, glaucerinite group, cualstibite group, hydrocalumite group, and unclassified.

Non-limiting examples of hydrotalcites include: pyroaurite, stichtite, meixnerite, iowaite, droninoite, woodallite, desaurelsite, takovite, reevesite, jamborite, quintinite, charmarite, caresite, zaccagnaite, chrlomagaluminite, fougerite, woodwardite, zincowoodwardite, honessite, claucocerinite, hydrowoodwardite, carrboydite, hydrohonessite, mountkeithite, sincaluminite, wermlandite, shigaite, nikischerite, motukoreaite, natroglaucocerinite, karchevskyite, cualstibite, xincalstibite, hydroclumite, kuzelite, coalingite, brugnatellite muskoxite, and combinations thereof.

Non-limiting examples of intercalated hydrotalcites (sometimes called iHTC) include: HTC-carbonate, HTC-phosphate, HTC-nitrate, and combinations thereof.

As used herein, "apatite" means: a phosphate mineral having calcium phosphate with some fluorine, chlorine, and other elements. In some embodiments, apatite is neutralized with group of phosphate minerals. One example of an apatite compound is hydroxyapatite.

As used herein, "bauxite residue" means; particulate alkaline clay produced as a byproduct of the Bayer Process (e.g. the process of refining of bauxite ore into alumina). In some embodiments, bauxite residue (sometimes called red mud) includes a plurality of metals, metal oxides, clay, and zeolites. In some embodiments, the bauxite residue is generally free from draining liquids and is neutralized from its original form (i.e. slurry having volatile components at a pH of approximately 13).

In some embodiments, the bauxite residue comprises a pH of 7. In some embodiments, the bauxite residue comprises a pH of 8. In some embodiments, the bauxite residue comprises a pH of 9. In some embodiments, the bauxite residue comprises a pH of 10. In some embodiments, the bauxite residue comprises a pH of 11. In some embodiments, the bauxite residue comprises a pH of 12. In some embodiments, the bauxite residue comprises a pH of between about 7 and 9.

In some embodiments, bauxite residue may be neutralized via acid or neutralized by the atmosphere (e.g. via reaction with ambient carbon dioxide and/or contact with anthropogenic carbon dioxide).

As used herein, "acid neutralized" means: a material (e.g. bauxite residue) which is made chemically neutral (or closer to neutral) through the addition of an acid. Non-limiting acids include: phosphoric acid, nitric acid, sulfuric acid, organic acids, minerals, and combinations thereof.

In some embodiments, the bauxite residue is neutralized with aluminum hydroxide, forming bauxite residue ($NO_3$). In some embodiments, the resulting bauxite residue compound has a nitrate content of 5-10 wt. %.

In some embodiments, the bauxite residue is neutralized with phosphoric acid, forming bauxite residue ($PO_4$). In some embodiments, the resulting bauxite residue compound has a phosphate content of 5-10 wt. %.

In some embodiments, phosphogypsum is used to neutralize bauxite residue.

As used herein, "dawsonite" means: a sodium aluminate carbonate hydroxide compound. In some embodiments, dawsonite is a byproduct of the refining step(s) (e.g. after addition of sodium hydroxide in the Bayer Process).

As used herein, "fukalite" means: a calcium silicate carbonate compound. In some embodiments, fukalite is a hydroxide or a fluoride derivative of a calcium silicate carbonate compound. In some embodiments, fukalite is a byproduct of the refining step(s) (e.g. after addition of sodium hydroxide in the Bayer Process).

In some embodiments, dawsonite, fukalite, hydroxyapatite, and hydroxymagnesite are components in bauxite residue. In some embodiments, dawsonite, fukalite, hydroxyapatite, and hydroxymagnesite are components in bauxite.

As used herein, "ESP" means the dust that comes from an electrostatic precipitator (i.e. used to clean industrial process exhaust streams). In some embodiments, ESP comprises (e.g. as a major component) alumina fines which are removed from exhaust fumes of industrial processes.

As used herein, "bauxite" means: an ore from which alumina is extracted. In some embodiments, bauxite ore comprises: alumina, iron oxides, silicates, calcium carbonate, sodium hydroxide, calcium oxide, titania, manganese oxide, magnesium oxide, phosphates. In some embodiments, bauxite comprises at least 30 wt. % alumina; at least 40% alumina; at least 50% alumina; at least 60% alumina; at least 70 wt. %; at least 80 wt. %; at least 90 wt. %, or higher.

As used herein, "hydromagnesite" means: a magnesium carbonate mineral.

As used herein, "dolomite" means an ore having magnesium carbonate and calcium carbonate therein.

As used herein, "red lime" means; a mixture of tricalcium aluminate (TCA) and calcium carbonate, with some iron oxides present, which is a byproduct of aluminum processing.

In some embodiments, TCA is the major component (i.e. at least 51 wt. %) in red lime. In some embodiments, TCA is at least 50 wt. %; at least 55 wt. %; at least 60 wt. %; at least 65 wt. %; at least 70 wt. %; at least 75 wt. %; at least wt. 80%; at least 85 wt. %; at least 90 wt. %; at least 95 wt. %; or at least 99 wt. % (with the remainder being calcium carbonate and/or iron oxides).

In some embodiments, TCA is the major component (i.e. not greater than 51 wt. %). In some embodiments, TCA is: not greater than 50 wt. %: not greater than 55 wt. %; not greater than 60 wt. %; not greater than 65 wt. %; not greater than 70 wt. %; not greater than 75 wt. %; not greater than. 80 wt %; not greater than 85 wt. %; not greater than 90 wt. %; not greater than 95 wt. %; or not greater than 99 wt. % (with the remainder being calcium carbonate and/or iron oxides).

In some embodiments, the fertilizer composition includes a pH adjusting component. Non-limiting examples of pH adjusting components include: nitric acid, phosphoric acid, bauxite residue, and combinations thereof. In some embodiments, the pH adjusting component is intercalated into the release agent (e.g. LDH). In some embodiments, the pH adjusting component is blended to/mixed with the release agent (e.g. neutralized bauxite residue).

In some embodiments, the fertilizer composition includes a plant nutrient. Non-limiting examples of plant nutrients include: N, P, K, Mg, Ca, K, trace elements (Fe, Mn, metals present in the release agents), and combinations thereof.

As used herein, "slow release fertilizer" means: a fertilizer having a gradual release of nutrients available for plant uptake (e.g. where the release rate cannot be predicted within prescribed time limits—or can be estimated only very roughly). In some embodiments, a slow release fertilizer (e.g. release agent coated urea fertilizer composition) is a modified version of a referenced fertilizer (e.g. urea fertilizer composition), such that the release of nutrients from a slow release rate fertilizer is slower than of the reference, non-modified fertilizer. In some embodiments, a slow release fertilizer reduces volatilization of urea as compared to the reference fertilizer.

Non-limiting examples of slow-release products are coated or partially coated fertilizers, in which the release of soluble nutrients is controlled through the coating, which includes soluble nutrient compounds, water insoluble, or slowly available water-soluble components. In some embodiments, a slow release fertilizer is a controlled release fertilizer.

As used herein, "controlled release fertilize" means: a fertilizer having a gradual release of nutrients available for plant uptake, where the release rate is predictable within certain limits. In some embodiments, controlled release fertilizer products release plant nutrients in a form available for plant uptake at a slower rate (and at a quantifiably reduced rate) than that of unmodified fertilizer product (i.e. where, in some embodiments, the controlled release fertilizer has insoluble portions and/or low solubility portions and the fertilizer is soluble).

In some embodiments, the Tennessee Valley Authority immersion test is used to evaluate a controlled release characteristic of a fertilizer composition. This test calls for adding 50 g of sample (fertilizer composition) to 250 mL of water, followed by heating the mixture at 100° F. for a specified period of time in order to quantify the release rate of the fertilizer sample (based on the nitrogen containing material release rate).

In some embodiments, fertilizer compositions of the instant disclosure comprise a release rate of not greater than 20 wt. % of nitrogen containing material in a 24 hour period (e.g. when measured in accordance with the TVA test). In some embodiments, the fertilizer compositions of the instant disclosure comprise a release rate of not greater than 50 wt. % of the nitrogen containing material in a 7 day period (when measured in accordance with the TVA test). In some embodiments, the fertilizer compositions of the instant disclosure comprise a release rate of not less than 80 wt. % of the nitrogen containing material in a 30 day period (when measured in accordance with the TVA test).

As used herein, "enhanced efficiency fertilizer" means: a fertilizer product with characteristics that allow increased nutrient availability and reduce the potential of nutrient losses to the environment (e.g. gaseous losses via evaporation, leaching of nutrients, or runoff of nutrients via water runoff), as compared to an appropriate reference (non-modified, uncoated fertilizer).

In some embodiments, one or more of the fertilizer compositions (i.e. coated fertilizer compositions of the instant disclosure include at least one of the following characteristics: growing medium enhancement, increased growing medium moisture content, increased growing medium buffering capacity, decreased phosphorous runoff from the growing medium, added micronutrients to the growing medium, decreased urease activity, inhibited urease activity, decreased ammonia absorption, ammonium binding, and combinations thereof.

As used herein, "evaporation" (sometimes called volatilization) means: a tendency of a material to pass off in a vapor.

In some embodiments, the fertilizer composition has an average size of: at least ⅛"; at least ¼"; at least ⅜"; at least ½"; at least ⅝"; at least ¾"; or at least 1". In some embodiments, the fertilizer composition has an average size of: not greater than ⅛"; not greater than ¼"; not greater than ⅜"; not greater than ½"; not greater than ⅝"; not greater than ¾"; or not greater than 1".

In some embodiments, the outer portion (e.g. whether a layer, multi-layer, a coating, and/or a shell) has an average thickness of: at least 25 microns, at least 50 microns; at least 75 microns; at least 100 microns; at least 125 microns, at least 150 microns; at least 175 microns; at least 200 microns; at least 225 microns, at least 250 microns; at least 275 microns; at least 300 microns; at least 325 microns, at least 350 microns; at least 375 microns; at least 400 microns; at least 425 microns, at least 450 microns; at least 475 microns; at least 500 microns; at least 525 microns, at least 550 microns; at least 575 microns; at least 600 microns; at least 625 microns, at least 650 microns; at least 675 microns; at least 700 microns; at least 725 microns, at least 750 microns; at least 775 microns; at least 800 microns; at least 825 microns, at least 850 microns; at least 875 microns; at least 900 microns; at least 925 microns, at least 950 microns; at least 975 microns; or at least 1000 microns.

In some embodiments, the outer portion (e.g. whether a layer, multi-layer, a coating, and/or a shell) has an average thickness of: not greater than 25 microns, not greater than 50 microns; not greater than 75 microns; not greater than 100 microns; not greater than 125 microns, not greater than 150 microns; not greater than 175 microns; not greater than 200 microns; not greater than 225 microns, not greater than 250 microns; not greater than 275 microns; not greater than 300 microns; not greater than 325 microns, not greater than 350 microns; not greater than 375 microns; not greater than 400 microns; not greater than 425 microns, not greater than 450 microns; not greater than 475 microns; not greater than 500 microns; not greater than 525 microns, not greater than 550 microns; not greater than 575 microns; not greater than 600 microns; not greater than 625 microns, not greater than 650 microns; not greater than 675 microns; not greater than 700 microns; not greater than 725 microns, not greater than 750 microns; not greater than 775 microns; not greater than 800 microns; not greater than 825 microns, not greater than 850 microns; not greater than 875 microns; not greater than 900 microns; not greater than 925 microns, not greater than 950 microns; not greater than 975 microns; or not greater than 1000 microns.

In some embodiments, the outer portion is: from 50 microns to 250 microns. In some embodiments, the outer portion is: from about 100 to about 200 microns.

In one aspect, a fertilizer composition, is provided, comprising: an inner portion comprising a nitrogen containing compound; and an outer portion coating the inner portion, the outer portion configured with a release agent comprising a layered double hydroxide, wherein the outer portion comprises not greater than 30 wt. % of the fertilizer composition.

In some embodiments, the nitrogen containing compound is urea.

In some embodiments, the layered double hydroxide is selected form the group consisting of hydrotalcite, hydrocalumite, and combinations thereof.

In some embodiments, the outer portion further comprises at least one of: a binder, a filler, and an additive.

In some embodiments, the outer layer comprises hydrotalcite and wax.

In one aspect, a fertilizer composition is provided, comprising: an inner portion comprising urea; and an outer portion coating the inner portion, the outer portion configured with a release agent comprising a hydrotalcite, wherein the outer portion comprises not greater than 20 wt. % of the fertilizer composition.

In some embodiments, the outer portion further comprises a binder.

In some embodiments, the binder further comprises a wax in an amount not exceeding 5 wt. % of the fertilizer composition.

In one aspect, a fertilizer composition is provided, comprising: an inner portion comprising urea; and an outer portion encasing the inner portion, the outer portion configured with a release agent including a Bayer Process byproduct selected from the group consisting of: bauxite residue and layered double hydroxides.

In some embodiments, the outer portion comprises 5 wt. % to 30 wt. % of the total weight of the composition.

In some embodiments, the outer portion comprises 10 wt. % to 20 wt. % of the total weight of the composition.

In some embodiments, the release agent is bauxite residue. In some embodiments, the release agent is hydrotalcite.

In some embodiments, the release agent is configured to slow the release of urea into a growing medium.

In one aspect, a fertilizer composition is provided, comprising: an inner portion comprising: a nitrogen containing material; and an outer portion encasing (e.g. completely surrounding) the inner portion, the outer portion comprising a release agent.

In one aspect, a fertilizer composition is provided, comprising: an inner portion comprising a urea composition; and an outer portion encasing (e.g. completely surrounding) the inner portion, the outer portion comprising a release agent.

In one aspect, a fertilizer composition is provided, comprising: an inner portion comprising a nitrogen containing material; and an outer portion encasing (e.g. completely surrounding) the inner portion, the outer portion comprising a release agent; wherein the outer portion comprises at least 5 wt. % to not greater than 30 wt. % of the total weight of the composition.

In one aspect, a fertilizer composition is provided, comprising: an inner portion comprising a nitrogen containing material and bauxite residue; and an outer portion encasing (e.g. completely surrounding) the inner portion, the outer portion comprising a release agent.

In one aspect, a fertilizer composition is provided, comprising: an inner portion comprising: a nitrogen containing material; and an outer shell around the inner portion, the outer shell comprising a release agent.

In one aspect, a fertilizer composition is provided, comprising: an inner portion comprising a nitrogen containing material; and an outer shell around the inner portion, the outer shell comprising a release agent and at least one of: a filler, a binder, and an additive.

In one aspect, a fertilizer composition is provided, comprising: an inner portion comprising: a nitrogen containing material and a release agent; and an outer portion comprising a release agent, where the outer portion is configured to completely surround the inner portion.

In one aspect, a fertilizer composition is provided, comprising: an inner portion comprising: a nitrogen containing composition and a coating comprising a release agent, where the coating (sometimes the outer portion) is configured to cover 30% to 100% of the inner portion (e.g. outer portion is a partial coating/porous coating).

In one aspect, a fertilizer composition is provided, comprising: an inner portion comprising: a nitrogen containing material and bauxite residue; and coating comprising a release agent, where the coating (sometimes the outer portion) is configured to cover 30% to 100% of the inner portion (e.g. outer portion is a partial coating/porous coating).

In some embodiments, the coating covers: at least 30% the surface of the inner core; at least 40% of the surface of the inner core; at least 50% of surface of the inner core; at least 60% of surface of the inner core; at least 70% of the surface of the inner core; at least 80% of the surface of the inner core; at least 90% of the surface of the inner core; at least 95% of the surface of the inner core; or at least 99% of the surface of the inner core.

In some embodiments, the coating covers: not greater than 30% of the surface of the inner core; not greater than 40% of the surface of the inner core; not greater than 50% of surface of the inner core; not greater than 60% of surface of the inner core; not greater than 70% of the surface of the inner core; not greater than 80% of the surface of the inner core; not greater than 90% of the surface of the inner core; not greater than 95% of the surface of the inner core; or not greater than 99% of the surface of the inner core. In some embodiments, the outer portion covers 100% of the inner portion.

In one aspect, a fertilizer composition is provided, comprising: a plurality of layers comprising a nitrogen containing material (e.g. urea) interspaced with a plurality of layers comprising a release agent, wherein outermost layer of the composition comprises a release agent coating/shell (e.g., including wax and/or polymer). In some embodiments, the nitrogen based material differs between layers (e.g. of the multi-layers, each individual nitrogen containing material layer is selected from this group: urea, ammonium nitrate, manure, diammonium phosphate, and combinations thereof.)

In one aspect, a fertilizer composition is provided, comprising: a plurality of layers comprising a nitrogen material (e.g. urea, ammonium nitrate, diammonium phosphate, manure, and combinations thereof) interspaced with a plurality of layers selected from the group consisting of: a release agent, binder, filler, additive, and combinations thereof, wherein at least one layer comprises a release agent. In some embodiments, the outer portion further comprises additives (e.g. binder, filler, additive).

In one or more embodiments of the instant disclosure, blends of fertilizer are provided. As non-limiting examples, the fertilizer composition includes: uncoated nitrogen containing material (e.g. nitrogen fertilizer or manure in prilled, pelletized, or granular form) and coated fertilizer (e.g. an inner core including a nitrogen containing material and an outer portion including a release agent.

In some embodiments, the fertilizer comprises a blend of coated fertilizer having coatings of different thicknesses. In some embodiments, the fertilizer comprises a blend of coated fertilizers, where at least some of the fertilizer comprises a single coating (e.g. partial and/or encasing) and at least some is mutli-layered. In some embodiments, the fertilizer includes a blend of at least two average particle sizes (e.g. large and small sized fertilizers, with coated and uncoated variations).

In some embodiments, the outer portion (e.g. coating or layer) comprises: at least 5 wt. %; at least 10 wt. %; at least 15 wt. %; at least 20 wt. %; at least 25 wt. %; or at least 30 wt. % of the total weight of the composition.

In some embodiments, the outer portion (e.g. coating or layer) comprises: not greater than 5 wt. %; not greater than 10 wt. %; not greater than 15 wt. %; not greater than 20 wt. %; not greater than 25 wt. %; or not greater than 30 wt. % of the total weight of the composition.

As non-limiting examples, at least one coating of the coated fertilizer composition includes, in combination with a release agent: wax (e.g. paraffin), sugar polymer (e.g. alginate, alginate in a calcium chloride-water solution, sodium alginate, cellulose in alginate, alginic acid), sugar polymer and wax, carboxylic acid (also called a carboxylate, depending on the pH) (e.g. fatty acid, black liquor); polyelectrolytes; polymers; Portland cement; and combinations thereof.

As used herein, "alginate" refers to a polysacharide derived from brown algae. In some embodiments, alginate molecules are capable of crosslinking with one another (e.g. in the presence of calcium chloride and water), thus forming a viscous liquid (e.g. resembling gelatin). In some embodiments, crosslinked alginate is configured to improve structural properties of the outer layer (e.g. coating). In some embodiments, alginate and or crosslinked alginate is used in combination with at least one of a bayer byproduct, bauxite residue, LDH, hydrotalcite, and/or hydrocalumite. In some embodiments, in order to form the cross-linked material, sodium alginate is sprayed with a calcium chloride solution (1M or 3M) in place of water.

In some embodiments, where the coated fertilizer has a plurality of coatings, at least one coating includes a release agent, and at least one other coating includes at least one of a release agent, binder, filler, additive, wax, sugar polymer, carboxylic acid, polyelectrolytes, polymers, Portland cement, and combinations thereof.

In one aspect, a method is provided, comprising: (a) forming a mixture (e.g. in a drum roller) of particulate a release agent and a nitrogen containing material; (b) spraying a liquid (e.g. water, industrial solvent) into the mixture to promote coating of the nitrogen containing material with the release agent (e.g. in some embodiments, liquid includes binder, additive, and/or filler); and (c) forming a coated composition, the fertilizer having: an inner portion of the nitrogen containing material and an outer portion (e.g. shell or coating) of the release agent (e.g. and/or filler, binder, additive).

In some embodiments, the method comprises: (d) baking the coated composition to remove the liquid and result in a fertilizer composition. In some embodiments, the method includes curing the coating (e.g. through application of heat, light, and/or time). As one example, when the coating includes silicate(s), the coating is baked. In one embodiment, when the coating includes Portland cement, it is allowed to cure at room temperature. In one embodiment, when the coating includes wax (e.g. and anti-caking agents), the coating solidifies at room temperature.

In some embodiments, the method comprises: (e) forming a mixture of coated composition and a release agent.

In some embodiments, the method comprises: repeating steps (b) through (c) on the mixture of coated composition and a release agent.

In one embodiment, the fertilizer composition comprises: a nitrogen containing compound (e.g. urea) admixed with an intercalated layered double hydroxide. In some embodiments, the layered double hydroxide is intercalated with urea.

In one embodiment, the fertilizer composition comprise: a blended nitrogen containing compound (e.g. urea) with a release agent, which is coated in a release agent. In some embodiments, the release agent (or combination of release agents) is/are the same in the coating as it is in the blended core component. In some embodiment, the release agent (or combination of release agents) is/are different in the coating as compared to the blended core component.

In some embodiments, the fertilizer composition includes: a nitrogen-containing compound (e.g. urea) blended with a release agent (e.g. including intercalated layered double hydroxide), which is coated with at least one release agent (where the release agent in the blend and coating may be the same or different release agents or combinations of release agents).

In one embodiment, fertilizer compositions of the instant disclosure are made by spraying the concentrated nitrogen-containing material solution (i.e. 96-99+ %) while simultaneously spraying a concentrated solution of the release agent(s) (e.g. suspended or in solution in a solvent) and co-prilling the resulting fertilizer composition.

In one embodiment, fertilizer compositions of the instant disclosure are made by adding the release agent(s) to the concentrated nitrogen-containing material solution prior to prilling.

In one embodiment, fertilizer compositions of the instant disclosure are made by coating the release agent(s) onto the prill after the nitrogen-containing material prill is formed. In some embodiments, a drum roller is used (e.g. with optional solvents and/or binders) to adhere and/or coat the release agent(s) onto the nitrogen-containing material prill.

In some embodiments, the release agent(s) are mixed into the nitrogen-containing material solution (with optional solvents) and the resulting fertilizer composition is recrystallized from solution or suspension.

In some embodiments, nitrogen-containing material prills are ground with release agent(s) in a milling press and utilized in a powder form. In some embodiments, the powder is mixed with binder(s) and rolled into agglomerated forms. In some embodiments, the blended powder is mixed with a binder and formed (e.g. pressed) into pellets or plates (e.g. with a disk-press or pelletization process).

In some embodiments, the solution (or suspension) of nitrogen-containing material with release agents (e.g. optionally with solvents to reduce viscosity) are spray dried.

In some embodiments, the solution (or suspension) of nitrogen-containing material with release agent(s) are agglomerated (e.g. pan agglomeration), followed by a pelletization process.

In some embodiments, the bauxite residue is raw bauxite residue (e.g. utilized without an acid neutralization step, in its in situ particle size distribution (without sieving)).

In some embodiments, the release agent, binder, filler, and/or additive is added via vapor deposition (e.g. place urea on a screen above heated release agent, binder, filler, and/or additive (and/or solvent, liquid) such that the vapors (containing release agent, binder, additive, and/or filler) contact the surface of the urea to form an outer portion/coating/shell on the urea (inner portion/core).

In some embodiments, the release agent, binder, filler, and/or additive was applied via dipping (e.g. placing the urea on a screen and dipping the screen and urea into a liquid containing release agent, binder, filler, and/or additive (with an optional solvent and/or liquid to suspend the release agent, binder, filler, and/or additive).

In some embodiments, binder, filler, and/or additive is added to the release agent during the (e.g. simultaneous to) the release agent coating onto the urea product.

Various ones of the inventive aspects noted hereinabove may be combined to yield fertilizer compositions (e.g. having urea and a release agent) and methods of making and using the same.

These and other aspects, advantages, and novel features of the invention are set forth in part in the description that follows and will become apparent to those skilled in the art upon examination of the following description and figures, or may be learned by practicing the invention.

BRIEF DESCRIPTION OF THE DRAWINGS

FIG. 1A provides an inner portion including a nitrogen containing material (e.g. urea composition) and an outer portion comprising a release agent (e.g. in the form of a coating or shell).

FIG. 1B provides an inner portion including a nitrogen containing material (e.g. urea composition) and an outer portion comprising a release agent (e.g. in the form of a coating or shell), where the outer portion is thicker (e.g. a higher wt. %) than that depicted in FIG. 1A.

FIG. 1C depicts an inner portion including a nitrogen containing material (e.g. urea composition) and an outer portion (e.g. in the form of a coating or shell), where the two layers are partial layers (e.g. not a complete shell or coating, but rather, a porous or discontinuous layer). The first layer is includes a release agent, while the second layer includes a binder, additive, and/or filler.

FIG. 1D provides an inner portion including a nitrogen containing material (e.g. urea composition) and an outer portion comprising a release agent (e.g. in the form of a coating or shell), where the outer portion has varying degrees of thickness (e.g. thicker vs. thinner areas) than that depicted in FIG. 1A.

FIGS. 2A-2D depict various embodiments of fertilizer compositions of the instant disclosure, in which the inner portion includes: a nitrogen containing material (e.g. urea composition) and a release agent and an outer portion comprises a release agent (e.g. in the form of a coating or shell). FIGS. 2A through 2D are similar to FIGS. 1A through 1D, but for the inner portion includes a release agent in addition to the nitrogen containing material.

FIG. 3A depicts an embodiment of a fertilizer composition having a plurality of coatings/layers.

FIG. 3B depicts an embodiment of a fertilizer composition having a combination of thin/thick layers, where one layer (e.g. the thick layer) is discontinuous (e.g. porous, partial covering).

FIG. 3C depicts an embodiment of a fertilizer composition having multiple partial layers.

FIG. 3D depicts an embodiment of a fertilizer composition having multiple layers, where each layer has varying thicknesses (thick and thin portions).

DETAILED DESCRIPTION

Figure 1A:
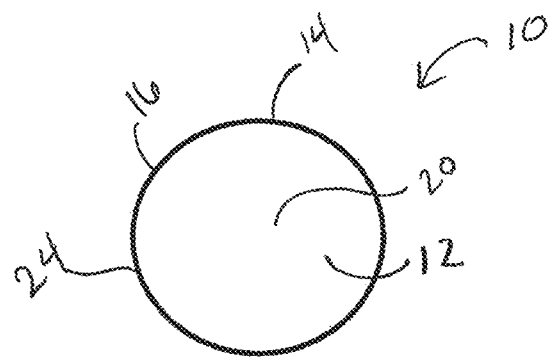
FIGS. 1A-1D depict various embodiments of fertilizer compositions of the instant disclosure, each having an inner portion of a nitrogen containing material and an outer portion of a release agent.

Reference will now be made in detail to the various embodiments, with reference to the aforementioned Figures, which at least assist in illustrating various pertinent embodiments of the present invention.

REFERENCE NUMBERS

Fertilizer 10
Inner portion 12
Outer portion 14
Coating 16
Partial coating 18
Nitrogen containing material 20
Release agent 24
Release agent coating additive 22 (e.g. filler, binder, additive)
Filler 26
Binder 28
Additive 30
Multi-layered coating (e.g. plurality of coatings) 40

Figure 1B:
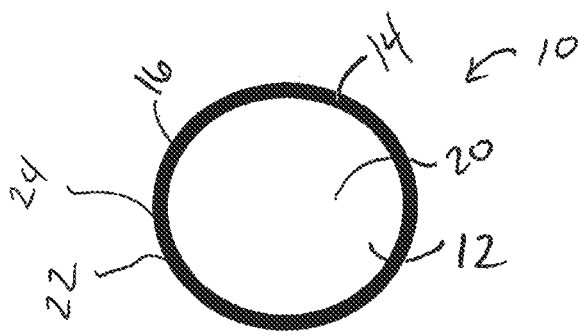
Figure 1C:
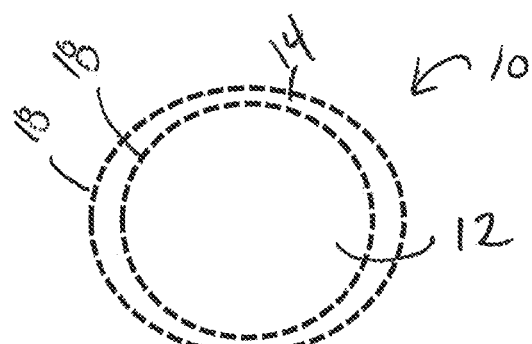
Figure 1D:
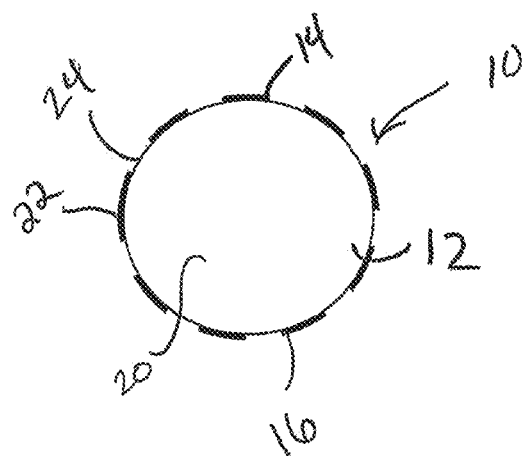

FIGS. 1A-1D depict various embodiments of fertilizer compositions 10 (coated fertilizers) of the instant disclosure, each having an inner portion 12 of a nitrogen containing material 20 and an outer portion 14 of a release agent 24. FIG. 1A provides a fertilizer composition having an inner portion 12 including a nitrogen containing material 20 (e.g. urea composition) and an outer portion 14 comprising a release agent 24 (e.g. in the form of a coating 16 or shell). FIG. 1B provides a coated fertilizer composition 10 having an inner portion 12 including a nitrogen containing material 20 (e.g. urea composition) and an outer portion 14 comprising a release agent 24 (e.g. in the form of a coating or shell), where the outer portion 14 is thicker (e.g. a higher wt. %) than that depicted in FIG. 1A. FIG. 1C depicts a fertilizer composition having an inner portion 12 including a nitrogen containing material 20 (e.g. urea composition) and an outer portion 14 (e.g. in the form of a coating or shell), where the two layers are partial layers (e.g. not a complete shell or coating, but rather, a porous or discontinuous layer). The first layer is includes a release agent 24, while the second layer includes a binder 28, additive 30, and/or filler 26. FIG. 1D provides a fertilizer composition 10 having an inner portion 12 including a nitrogen containing material 20 (e.g. urea composition) and an outer portion 14 comprising a release agent 24 (e.g. in the form of a coating or shell), where the outer portion 14 has varying degrees of thickness (e.g. thicker vs. thinner areas) than that depicted in FIG. 1A.

FIGS. 2A-2D depict various embodiments of fertilizer compositions 10 of the instant disclosure, in which the inner portion 12 includes: a nitrogen containing material 20 (e.g. urea composition) and a release agent 24 and an outer portion 14 comprises a release agent 24 (e.g. in the form of a coating or shell). FIGS. 2A through 2D are similar to FIGS. 1A through 1D, but for the inner portion 12 includes a release agent 24 in addition to the nitrogen containing material 20.

Figure 3A:
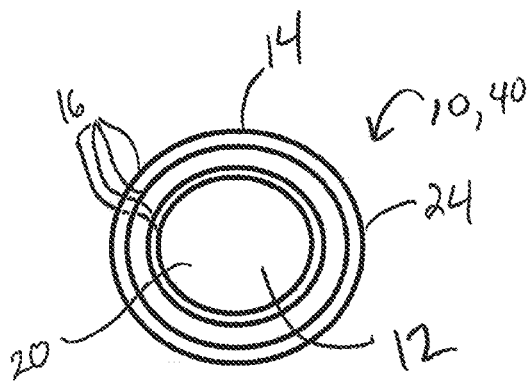
FIGS. 3A-3D depict various embodiments of fertilizer compositions of the instant disclosure, in which the composition includes multiple layers (e.g. a plurality of nitrogen containing material layers interspaced with a plurality of release agent layers).
Figure 3B:
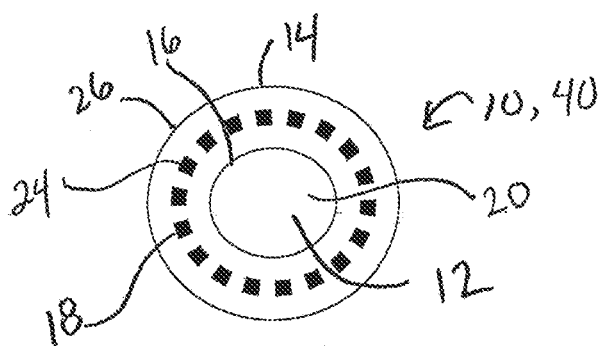
Figure 3C:
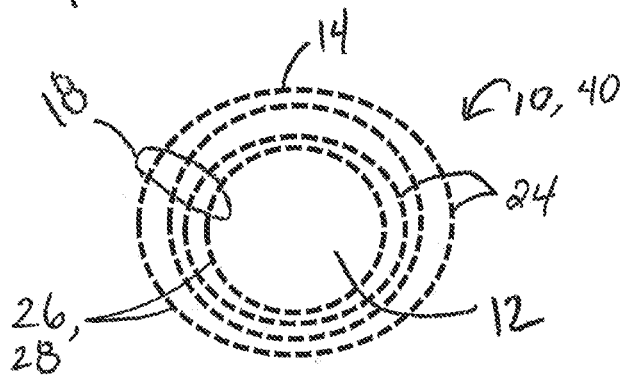
Figure 3D:
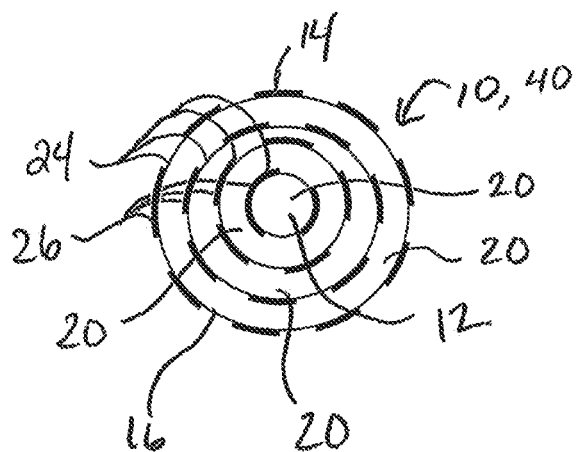
Figure 4:
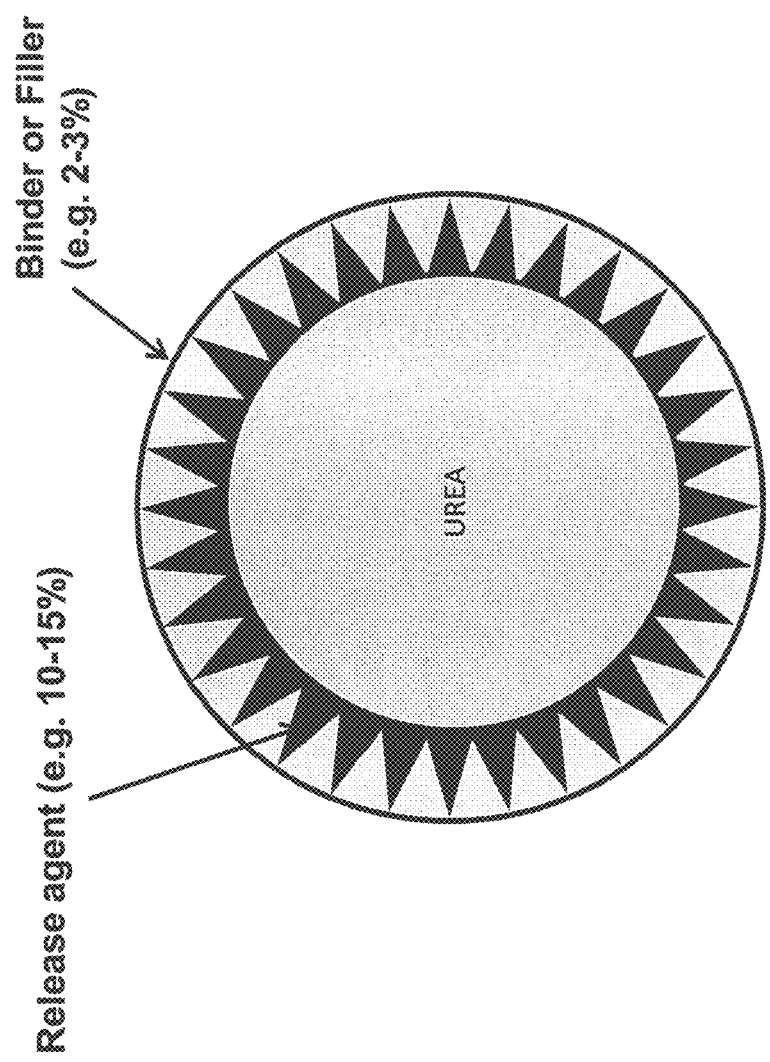
FIG. 4 depicts an embodiment of a fertilizer composition having an inner core (e.g. urea) and an outer shell, where the outer shell includes both a release agent and a binder, with the binder positioned over the top of the release agent.

FIGS. 3A-3D depict various embodiments of fertilizer compositions 10 of the instant disclosure, in which the composition includes multiple layers 40 (e.g. a plurality of nitrogen containing material layers interspaced with a plurality of release agent layers). FIG. 3A depicts an embodiment of a fertilizer composition 10 having a plurality of coatings/layers 40. FIG. 3B depicts an embodiment of a fertilizer composition 10 having a combination of thin/thick layers, where one layer (e.g. the thick layer) is discontinuous (e.g. porous, partial covering). FIG. 3C depicts an embodiment of a fertilizer composition 10 having multiple partial layers 40. FIG. 3D depicts an embodiment of a fertilizer composition 10 having multiple layers 40, where each layer has varying thicknesses (thick and thin portions).

Example: Coated Fertilizer Processing and Analysis

Commercially available urea prills were coated with various release agent/binder combinations and analysis and testing was performed with the coated fertilizer compositions. Commercially available urea prills measuring from −5 to +8 mesh (2.36 mm-4 mm) were used for coating. Raw bauxite residue indicates the "as received" residue, which was dried to remove excess moisture and pulverized to −80 mesh. Bauxite residue was sieved according to the mesh size. The different particle size fractions investigated were: −80 mesh, −80/+200 mesh, and −200 mesh.

Individual batches were produced by heating 150 grams of urea prills in the oven at 105° C. for 20 minutes. The prills reached a temperature of 85° C. The prilling pan was placed in the oven at 70° C. at least 1 hour prior to coating. The heated prilling pan was rotated at 50% speed with a heat gun placed near the base to maintain pan temperature.

Raw bauxite residue and HTC were coated with one of three of the following waxes: paraffin (Acros Organics), and two agricultural blends, R-3053 and 7089A (The International Group, Inc.). All pH reduced bauxite residue or sieved residue was coateded with paraffin wax (petroleum).

Thirty grams of bauxite residue was used to coat the 150 grams of urea. Half of the bauxite residue was added to the rotating pan before adding the urea prills. The heated prills were then added to the pan and mixed with a spoon to ensure an even coating (as observed via visual inspection). The remaining bauxite residue was applied after water was lightly sprayed onto the coated prills. Once the prills appeared to be fully coated (over a 2-5 min span of time) the remaining bauxite residue was collected (removed) in order to determine the percent coverage.

The resulting coatings in each case provided bauxite residue coverage resulting in 10-15 wt. % of total coated prill mass. The coated prills were then cured at 105° C. for 20 minutes. The prilling pan was left to rotate and heat application was continued. Next, 5 grams of wax was placed in the oven until soft and partially liquid, depending on the wax. The coated prills were placed back in the heated prilling pan and the wax was added. The prills were mixed until an even coating of wax was observed and the color darkened (both characteristics confirmed via visual inspection). The resulting coated prills were removed and cured at room temperature overnight.

The release rate evaluation was based on Tennessee Valley Authority (Bloum et al, Ag and Food Chem, 1971, Vol 19, No 5, 801-808 (hereinafter "TVA test"), which provides a published guideline for quantifying the release of urea into a water solution at a specified temperature, over standard periods of time. The TVA test provides the following nitrogen release guidelines to be considered a controlled release fertilizer less than 20% release after 24 hours (1 day); 50% release after 72 hours (three days); and 80% release after 168 hours (one week).

The nitrogen release rate of each type of coating was evaluated using a water dissolution test (TVA test). In a mL vial, 7 grams of coated urea product was added to 35 mL of deionized water and placed in the oven at 100° F. for 1, 3, and 7 days. For each timepoint, the leachate was collected via gravity filtration. Care was taken to minimize the release of additional urea. The filtrates were analyzed for nitrogen content using HACH High Range Total Nitrogen field test kits.

Figure 5:
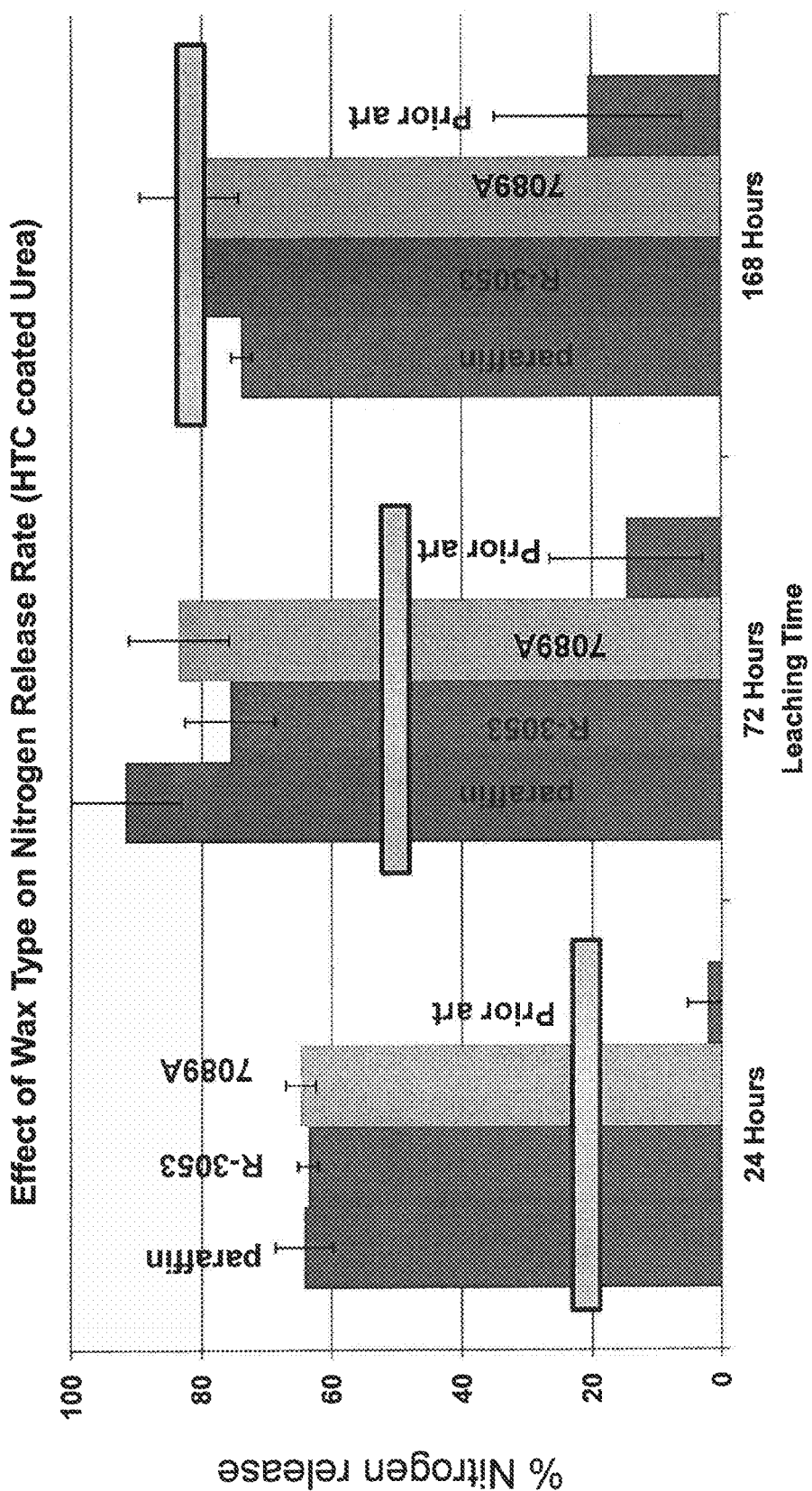
FIG. 5 is a chart of experimental data, the effect of wax type on nitrogen release rate (for HTC coated Urea).
Figure 6:
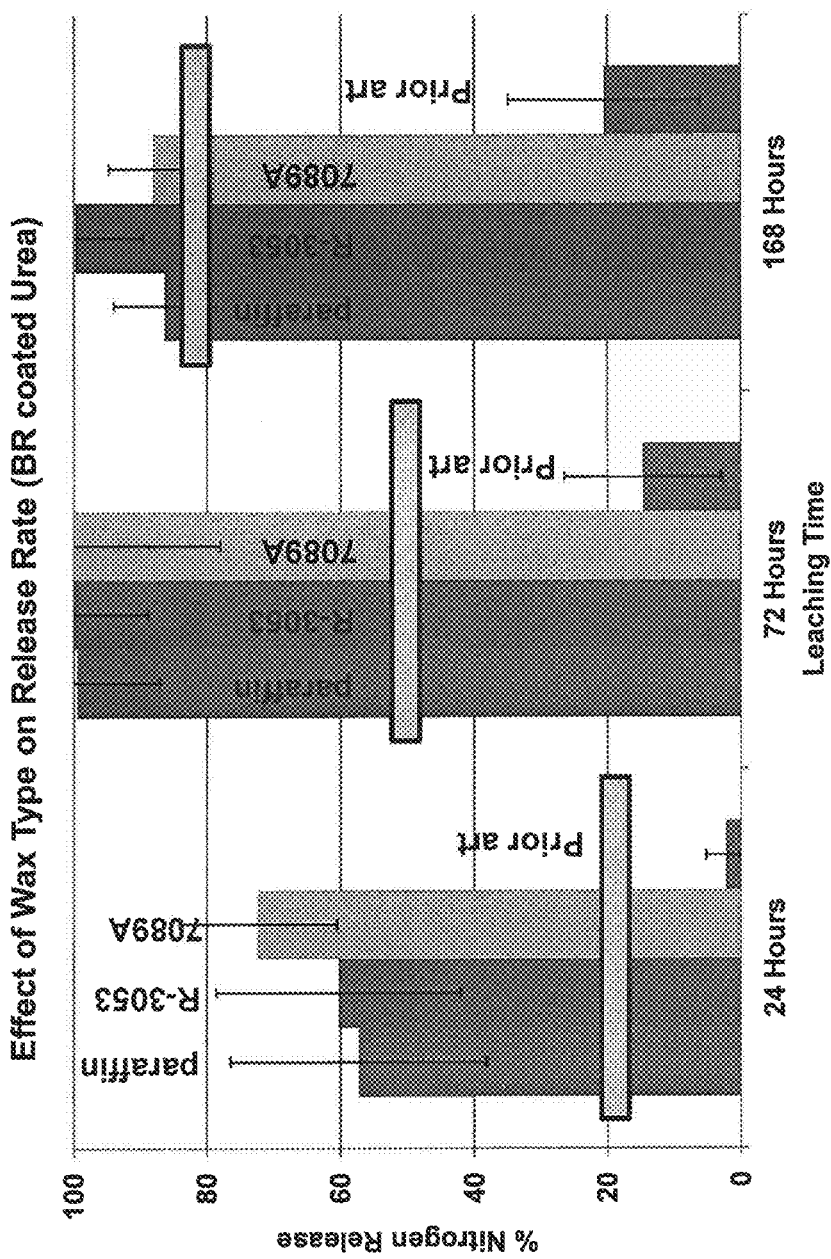
FIG. 6 depicts a chart of experimental data, the effect of wax type on nitrogen release (for BR coated Urea).
Figure 7:
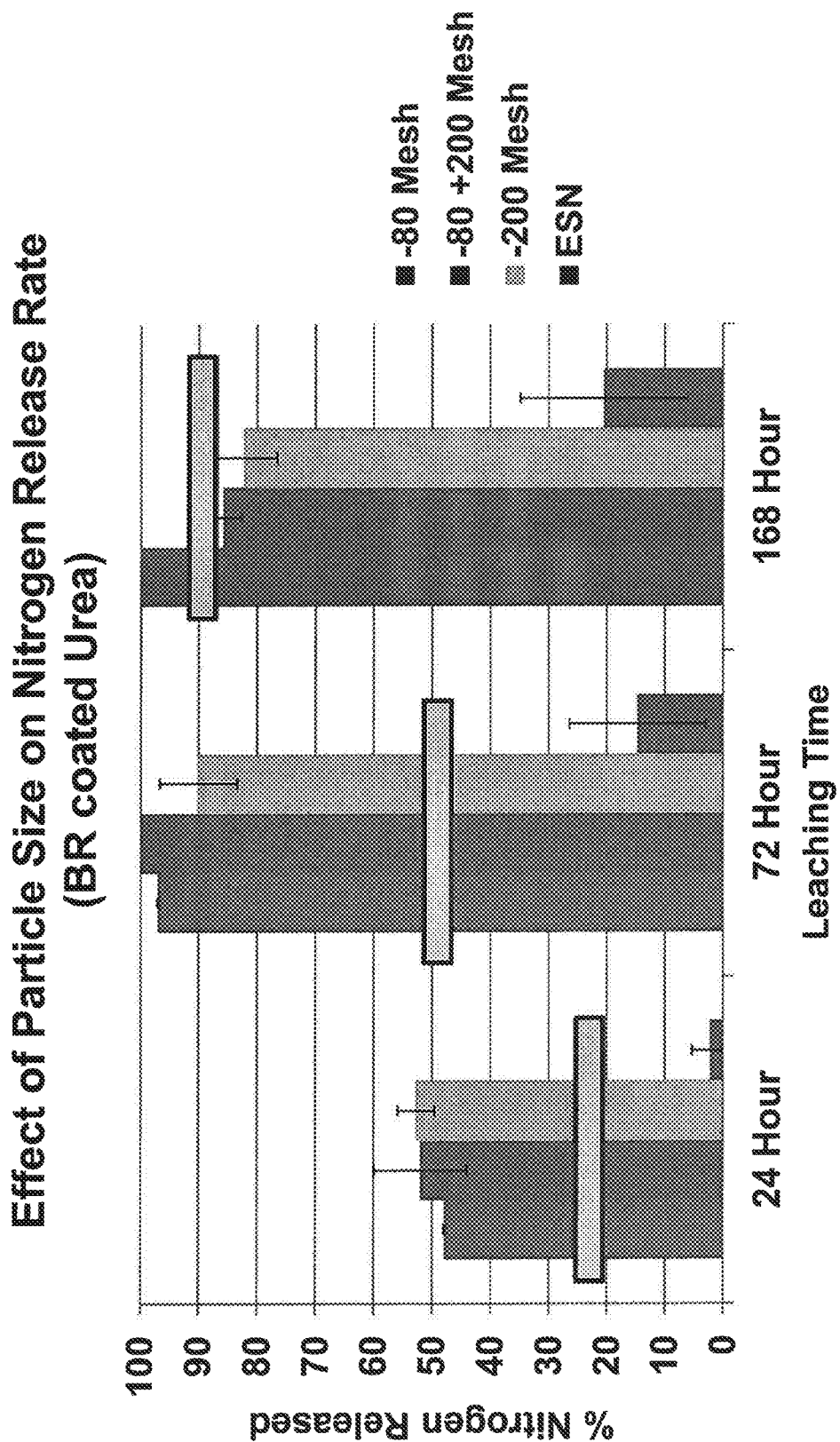
FIG. 7 is a chart of experimental data, the effect of bauxite residue particle size on nitrogen release rate (for bauxite residue coated urea).

Plots providing the nitrogen release as a function of time for the various tests are depicted in FIGS. 5-7. Referring to these figures, the horizontal bar across each set of data points depicts the target nitrogen release rates based on the guidelines described by the Tennessee Valley Authority test previously described. Error bars represent standard deviation when more than 4 samples were tested. However, when only two samples were measured the maximum and minimum value of the duplicates tested was used to represent error (particle size day 3, 7, pH reduced bauxite residue day 3). When duplicates were not available a standard error of 10% was implemented (HTC day 3). None of the coatings tested performed within the target release rates for all checkpoints of the water dissolution test: days 1, 3, and 7.

Referring to FIG. 5, results from the water dissolution test showed no significant effect on nitrogen release rate between the three waxes used to coat bauxite residue. Referring to FIG. 6, a small difference was seen between wax types on HTC coated prills but neither set of experiments suggest that the wax greatly contributes to the release rate. Referring to FIG. 7, particle size appears to have an effect on the release rate. As depicted in FIG. 7, smaller a bauxite residue particle size resulted in a slower release rate as compared to the larger bauxite residue particle size. Also, the results provided that, after 3 days, bauxite residue of reduced pH did not perform differently than bauxite residue of higher pH. The small amount of bauxite residue coating the prill did not appear to affect the microenvironment surrounding the prill (i.e. water).

The experiments illustrated that bauxite residue can control the release of nitrogen from area fertilizer. The experiments showed that bauxite residue particle size does demonstrate an effect on nitrogen release rate in water; smaller particle size results in a slower release. The experiments showed that the type of wax (of the three types tested) appeared to have no effect on nitrogen release rates in water. The experiments also suggested that the pH of the residue coating had no significant effect on release rates, after 3 days in water. However, none of the investigated parameters appear to be the greatest limiting factor on nitrogen release rate in water as no coating met the controlled release guidelines for all days 1, 3, and 7.

Example: Lab Scale Growth Stud

A small scale study was completed in order to determine the effectiveness of various coated fertilizers on growth of crops (long white bunching onions). The environmental conditions included container growing, where the containers were situated indoors with controlled irrigation, and where the commercially available soil was fertilized with P and K.

Three commercially available fertilizers (prior art) were tested against coated urea fertilizers and a control (no fertilizer) in a lab scale crop study. The commercially available fertilizers included: urea (uncoated/unmodified), ammonium nitrate (nitrogen containing fertilizer, uncoated/unmodified) and a commercially available polymer coated nitrogen fertilizer (ESN, Agrium, Inc.). There were five different coated urea fertilizers tested (four coated with bauxite residue, where the each bauxite residue sample had a different pH: 10, 9, 8, or 7) and one coated urea fertilizer, which was coated with HTC. The control did not have any fertilizer applied to the soil.

A custom bioremediation simulator was initially used to provide a controlled environment for the growth study. Initially poor results suggested that simulator conditions were not optimal for growth, most likely due to lack of air flow and drastic humidity changes. Two weeks into the growth study, the plants and containers were removed from the simulator and placed indoors, in close proximity to a window to permit light permeating through the windows to reach the containers. Ambient sunlight reached the containers and temperatures neared 85° F. at midday with 70° F. conditions in the early morning and evening. The humidity was consistently between 45-50%. Plant health was observed to improve nearly immediately after making this change.

The commercial fertilizers and coated fertilizers (urea with BR or HTC coatings) are the same as described above. The control group for the study contained no nitrogen fertilizer.

Each of the containers was filled with soil to within 1-2 inches of the maximum capacity in order to account for settling and to maximize soil volume. Five onion seeds were planted in each container at a depth of 0.25 inches with 2 inches between seeds. All seeds have approximately 4 inches on each side for growth. Watering was performed using a spray bottle and tap water, as needed, to maintain soil moisture. Two days after planting, nitrogen fertilizer was added near the edges of the container at a depth of 2 inches to avoid burning the seeds. Container positions were rotated weekly.

After the initial movement of onions after week two, foliage improved in color and an increase in height was seen in all containers.

Figure 8:
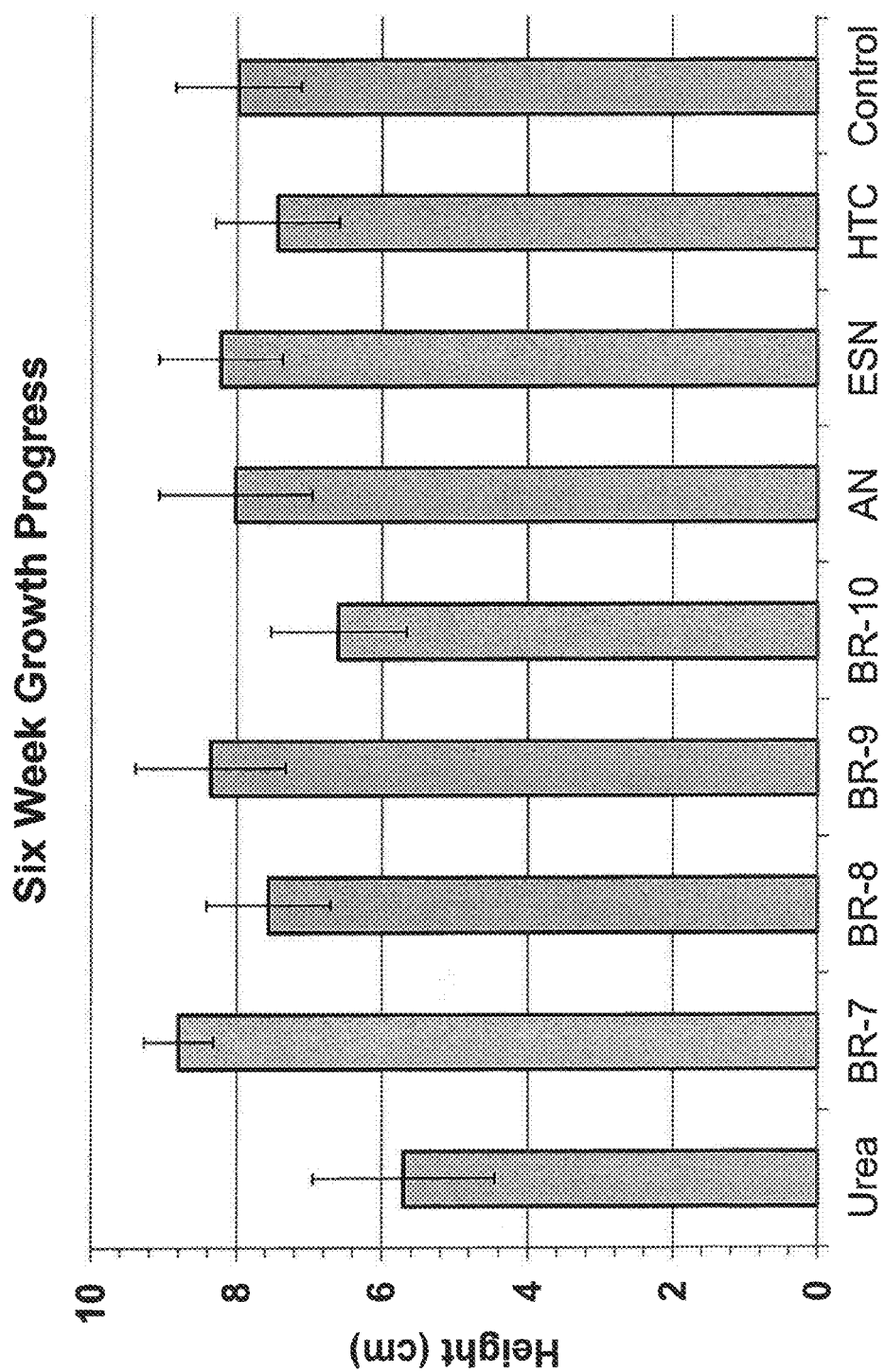
FIG. 8 is a chart of experimental data, illustrating the six week growth progress for lab scale growth studies utilizing various types of control fertilizers and coated fertilizer compositions.

The six week growth progress is depicted in FIG. 8, including average height for each sample. Coated fertilizer products outperformed uncoated urea fertilizers and were on par with commercially available products when considering plant height after 6 weeks. The height measurements were obtained from the highest (tallest) point of a stem on a plant. Error bars represent the standard deviation of plant heights from each container. Onion growth is relatively uniform across all fertilizer types except for uncoated urea, which is performing poorer than no nitrogen fertilizer at all. Considering standard deviation, all containers are growing at a similar rate, except for the uncoated urea. Without being bound by a particular mechanism or theory, one explanation for the underperformance of the uncoated urea is that the nitrogen was released too rapidly and burned the seeds or young sprouts.

Example: Coated Fertilizer Crop Studies

Two Studies were completed in which two different crops were planted, in different geographies (i.e. midwestern US and northeastern US).

For the mid-western crop study, grain corn was grown. One coated fertilizer composition was tested: urea coated with bauxite residue (13 wt. %) and wax (3 wt. %, paraffin wax) (prepared as described above). Ammonia volatilization data was collected. The corn Mowed a typical agricultural schedule, planting occurred in may and harvesting occurred in September. The total crop was reported as a grain yield (bushels/acre) at 15.5% moisture.

For the northeastern crop study, providence sweet corn was grown. The growing medium was sandy soil, which was determined to be a good indicator for understanding whether and to what extent the fertilizers exhibited leaching of the fertilizer compounds. One coated urea fertilizer composition was evaluated, urea coated with hydrotalcite (12 wt. %) and wax (3%, paraffin wax) (prepared as described above). The corn followed a typical agricultural schedule, planting occurred in July and harvesting occurred in September.

Lysimeter samples were collected and analyzed for nitrate. The crop was reported as a harvestable yield (e.g. ears/acre and 100 lb/acre).

In both cases, the coated urea fertilizer was evaluated against controls including: urea (uncoated/unmodified), UAN (Urea/ammonium nitrate aqueous solution), and ESN (Environmentally Smart Nitrogen, Agrium, Inc.).

For the midwestern crop study, planting occurred in mid-may, with fertilizer application occurring in early June and harvesting in mid-September. The yields were reported as follows (with a nitrogen application rate of 120 lbs N/acre): UAN had a yield of 193.6 bu/acre; AN had a yield of 187.2 bu/acre; Urea had a yield of 180.5 bu/acre; the control (no nitrogen had a yield of 91.9 bu/acre; and the Coated Fertilizer Composition (12 wt. % BR+3 wt. % wax) had a yield of 179.0 bu/acre.

For the northeastern crop study, planting occurred in early July, with fertilizer application occurring (via sidedress) in early august and the harvest occurring in mid-September.

| Source | N Rate (lbs N/acre) | Yield (1,000 ears/acre) | Yield (100 wt) |
|---|---|---|---|
| Control (no N) | n/a | 12.9 | 68 |
| UAN | 140 | 16.7 | 92 |
| UAN | 100 | 18.4 | 102 |
| Urea | 140 | 16.5 | 101 |
| Urea | 100 | 18.3 | 102 |
| AN | 140 | 16.0 | 99 |
| AN | 100 | 15.8 | 87 |
| Coated Fertilizer 1 | 140 | 16.0 | 87 |
| Coated Fertilizer 2 | 100 | 15.6 | 87 |
| ESN | 140 | 18.6 | 105 |
| ESN | 100 | 18.8 | 101 |

The following observations were made: lower than average rainfall and temperatures caused decreased plant growth, which is believed to have resulted in lower resolution between treatments, and thus, less statistically significant differences. The yields from this crop study were approximately ~2000 ears less than average for this crop in this growing region. Also, it was noted that low temperatures and rainfall caused low fertilizer losses, with some burning observed. The coated fertilizer's performance was statistically indistinguishable from nitrogen controls (urea, UAN, and ESN) on grain corn.

For the Midwestern crop study (grain corn), the higher nitrogen rates resulted in increased yields. Upon review, it was possible to distinguish some of the high N treatments from some of the low N treatments, but it was not possible to distinguish among the high N or among the low N treatments.

For the northeastern crop study (sweet corn), the data from the fertilizer trials and controls were statistically indistinguishable, in that there were no statistically observable differences between the trials. It is noted that lower than average rain fall and temperatures caused a decrease in all crop growth.

Upon review and statistical analysis, it was determined that no statistical differences were observed between the commercially available uncoated fertilizers, the commercially available coated fertilizer, and the coated fertilizer compositions of the instant disclosure. Separate statistical analysis was performed on the crop studies by a representative of the growing partner, and the statistical analysis yielded the same results (i.e. was in agreement with the foregoing).

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A fertilizer composition, comprising: an inner portion comprising a nitrogen containing compound; and an outer portion coating the inner portion, the outer portion containing (a) a release agent comprising a layered double hydroxide and (b) a release agent coating additive, wherein the outer portion comprises 5 wt. % to not greater than 30 wt. % of the fertilizer composition.

2. The fertilizer composition of claim 1, wherein the nitrogen containing compound is urea.

3. The fertilizer composition of claim 1, wherein the layered double hydroxide is selected from the group consisting of: hydrotalcite, hydrocalumite, and combinations thereof.

4. The fertilizer composition of claim 1, wherein the outer portion is selected from the group consisting of: of a binder, a filler, an additive; and combinations thereof.

5. The fertilizer composition of claim 1, wherein the outer layer comprises hydrotalcite and wax.

6. A fertilizer composition, comprising: an inner portion comprising urea; and an outer portion coating the inner portion, the outer portion containing a release agent comprising a hydrocalumite, wherein the outer portion comprises 10 wt. % to not greater than 20 wt. % of the fertilizer composition.

7. The composition of claim 6, wherein the outer portion further comprises a binder.

8. The composition of claim 7, wherein the binder further comprises a wax in an amount not exceeding 5 wt. % of the fertilizer composition.

9. The fertilizer composition of claim 1, wherein the release agent coating additive is selected from the group consisting of: a wax, a sugar polymer, carboxylic acid, polyelectrolytes, polymers, Portland cement, and combinations thereof.

10. The fertilizer composition of claim 1, wherein the release agent comprises from 10 wt. % to 15 wt. % of the fertilizer composition and the release agent coating additive comprises from 2 wt. % to 3 wt. % of the total fertilizer composition.

11. The fertilizer composition of claim 1, wherein the outer portion is configured to provide a controlled release fertilizer.

12. A fertilizer composition, comprising: an inner portion comprising urea; and an outer portion encasing the inner portion, the outer portion containing a release agent including a Bayer Process byproduct selected from the group consisting of: bauxite residue and layered double hydroxides; wherein the release agent is present in an amount of 10 wt. % to not greater than 20 wt. % of the total fertilizer composition.

13. The fertilizer composition of claim 12, wherein the outer portion comprises 5 wt. % to 30 wt. % of the total weight of the composition.

14. The fertilizer composition of claim 12, wherein the outer portion comprises 10 wt. % to 20 wt. % of the total weight of the composition.

15. The fertilizer composition of claim 12, wherein the release agent is bauxite residue.

16. The fertilizer composition of claim 12, wherein the release agent is hydrotalcite.

17. The fertilizer composition of claim 12, wherein the release agent is configured to slow the release of urea into a growing medium.

\* \* \* \* \*